Patented Jan. 7, 1941

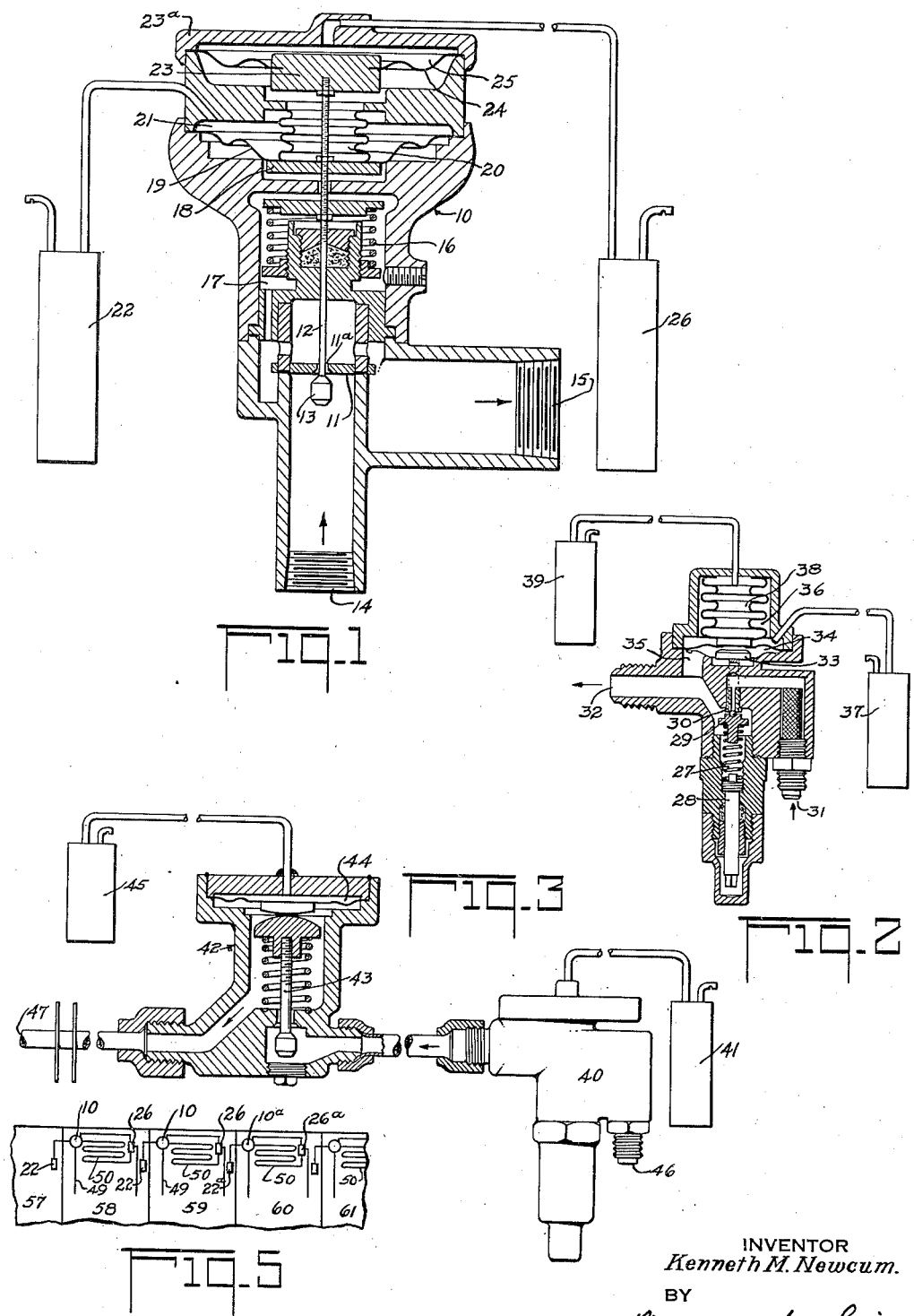

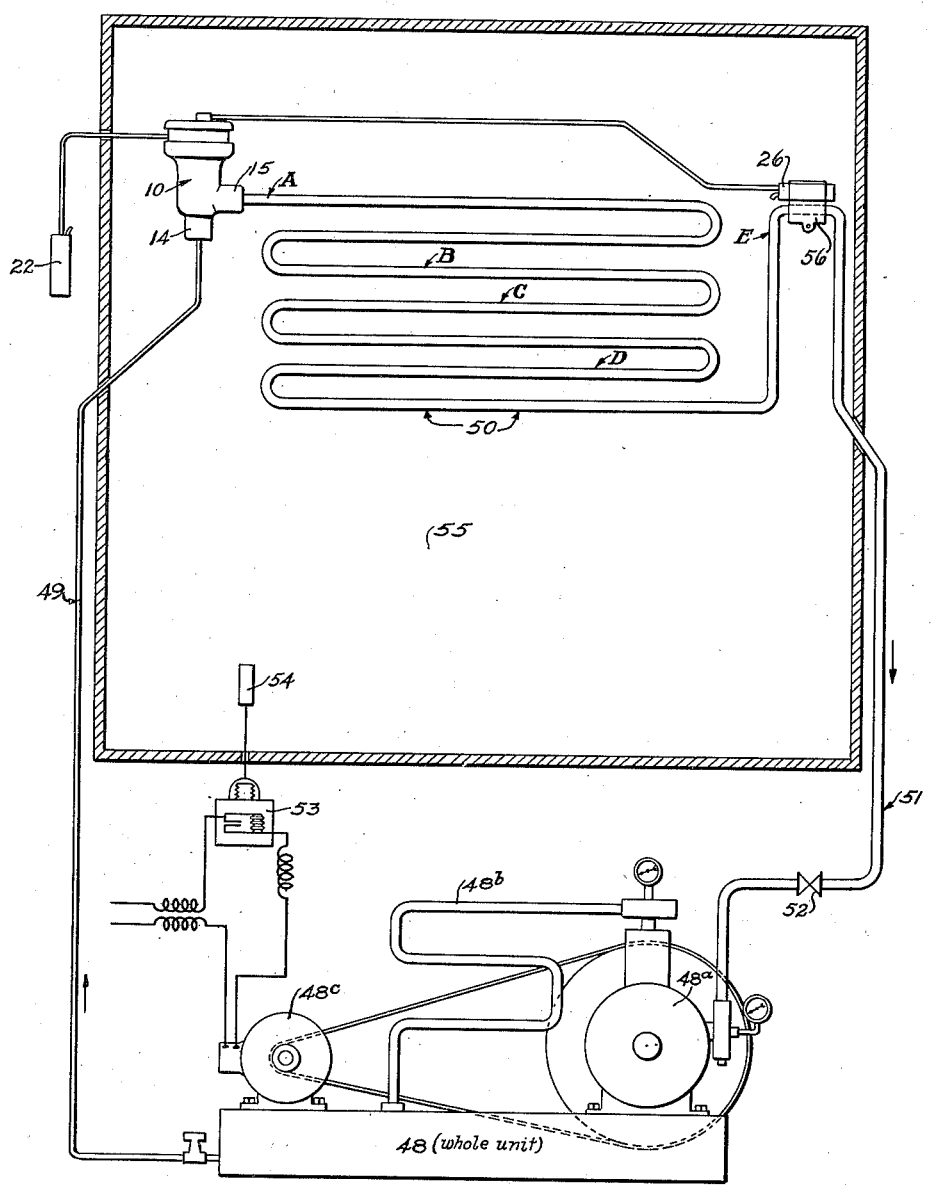

2,227,760

UNITED STATES PATENT OFFICE 2,227,760

SYSTEM OF REFRIGERATION AND VALVE THEREFOR

Kenneth M. Newcum, Port Washington, N. Y.

Application August 3, 1937, Serial No. 157,087

10 Claims. (Cl. 62—3)

This invention relates to improvements in systems of refrigeration and valves therefor.

An object of the invention is to provide a system of refrigeration including means to maintain a constant degree of relative humidity in the refrigerated space regardless of varying seasonal outside or room temperature conditions.

A particular object is to provide a system of the above type adapted to eliminate the development of excessive humidity in the refrigerated space when operating fin-and-tube evaporators or the like in cool weather, the temperature control being accomplished by conventional means.

Another object is to control the effective evaporator surface without the use of sectionalizing valves, the entire evaporator being in circuit at all times.

A further object is to provide a dual thermostatic valve for use in a refrigeration system as herein described.

Still another object is to provide a system employing a valve of the above type in conjunction with a constant minimum pressure valve in the suction line.

Other objects and advantages will be apparent from the following specification, and it will be perceived that many changes in details of construction and operation of the component parts of the system can be made without, however, avoiding the appended claims.

The system and apparatus herein disclosed may be used with any known type of refrigeration apparatus such, for example, as an absorption system or one in which a compressor is used, and in any case any suitable refrigerant may be used. Such modifications as are necessary in the hook-up and construction of the parts for use with different apparatus and refrigerants are well known to those skilled in the art, therefore, for the sake of illustration, the following specification discloses the system as using a compressor and ammonia or sulphur dioxide.

In the accompanying drawings:

Figure 1 is a diagrammatic view, partly in section, of a dual thermostatic valve for use in the system of refrigeration herein described;

Figure 2 is a view similar to Figure 1 of an alternate form of the valve;

Figure 3 is a diagrammatic view, partly in section, of two valves arranged in series and for use in the types of refrigeration systems described herein;

Figure 4 is a diagram of a refrigeration system as herein described showing the valve, Figure 1, therein; and Figure 5 is a diagram of a refrigeration system as herein described, showing a plurality of refrigerated compartments, each compartment being cooled in accordance with the differential obtained by the use of valves, Figure 1, 2 or 3.

As the most essential element of the system is the dual valve, it will be first described.

Referring to Figure 1, showing a preferred form of dual valve, this replaces the usual expansion valve of a refrigeration system, or is used in series with the usual expansion valve, as shown in Figure 3.

The numeral 10 denotes the valve body and 11 a valve seat therein having an orifice 11a through which the valve stem 12 passes as shown. The throttling valve head 13, therefore, will regulate the area of the orifice 11a and permit more or less refrigerant to flow from the inlet pipe 14 to the outlet pipe 15 of the valve depending upon the vertical movement of stem 12.

The valve has the usual spring-loading arrangement 16 connected to stem 12 so as to make the position of the stem dependent upon the suction or pressure existing in the chamber 17. The stem 12 extends upwardly and is sealed into the head 18 of a diaphragm 19, which, with the flexible bellows seal member 20 (having its ends secured to head 18 and the inner wall of the body 10) forms a sealed chamber 21 within the valve.

The head 18 is, by this construction, free to vertically move the stem 12 secured thereto, dependent upon the flexing of the diaphragm 19. The usual thermostatic bulb 22 is in fluid connection with the chamber 21 and operates in the usual way to flex the diaphragm 19 therein.

The stem 12 extends upwardly through the center of bellows seal 20 and has its upper end secured to a second head 23 secured to a second diaphragm 24 which, together with the valve cap 23a forms a sealed chamber 25 within the valve, said head 23, by this construction, is free to vertically move the stem 12 secured thereto, dependent upon the flexing of the diaphragm 24.

A second thermostatic bulb 26 in is fluid connection with the chamber 25 and operates in the usual way to flex the diaphragm 24 therein.

The movement of stem 12 is subject to the pressure conditions in chambers 17, 21 and 25 and it is obvious that the flow of refrigerant through the orifice 11a of the valve will be regulated by these pressures in the manner and to the extent hereinafter pointed out.

The valve, Figure 2, operates in the same manner as the valve Figure 1 but is of slightly different construction. Here the spring loading is applied at 27 and the spring tension is adjusted by the screw stem 28. The spring forces the plunger 29 and ball valve member carried thereon against orifice in the valve stem 30, thereby controlling the flow of refrigerant from the inlet 31 to the outlet 32. The valve stem 30 extends upwardly and has a head 33 in contact with the lower side of the diaphragm 34, the lower face of which is in communication via duct 35 with outlet 32 and the other face of which forms one wall of the sealed chamber 36. Connected to said chamber is the thermostatic bulb 37, and located in said chamber is the sealed expansion bellows 38 connected to the thermostatic bulb 39.

The movement of stem 30 is subject to the pressure conditions in 35, 36 and 38 and it is obvious that the flow of refrigerant will be regulated by these pressures in the manner and to the extent hereinafter pointed out.

In Figure 3 is shown an arrangement where two separate valves are used instead of the valves, Figures 1 and 2. In Figure 3 the numeral 40 denotes an ordinary expansion valve having the usual thermostatic bulb 41 connected thereto. Increased pressure in the bulb 41 tends to open the valve. At 42 is shown another valve connected in series with valve 40 and having the spring loaded stem 43 and a diaphragm 44 controlled by thermostatic bulb 45. Pressure in this bulb tends to open valve 42. The rate of flow between the inlet 46 and outlet 47 of this pair of valves will be dependent upon the pressures in bulbs 41 and 45 and these valves will operate in a refrigeration system to accomplish the same results as the valves, Figures 1 and 2, and in a manner to be presently described.

Any of these valves will operate as a liquid refrigerant throttling device in a refrigeration system where the refrigerant is circulated through the evaporator and where the valve inlet 14 is connected to the liquid line of a refrigeration condensing unit, and the outlet 15 is connected to the inlet of an evaporator, as shown at 50.

Such a system is shown in Figure 4, which further discloses certain methods of connecting and placing the thermostatic bulbs connected to the valve (or the valves, Figure 3) so as to secure new and improved results heretofore unobtainable except by arrangements employing much additional apparatus and a multiplicity of controls, or controls operated by the pressure of the refrigerant, all of which have been entirely eliminated.

The usual compressor-condensor unit is diagrammatically shown at 48, the base thereof forming the liquid receiver. This unit may include the compressor 48a, the condenser 48b and the usual electric motor 48c for driving the compressor. A liquid line 49 connects the receiver to the inlet 14 of the valve 10 (shown in detail in Figure 1). The outlet 15 of the valve connects to the evaporator or cooling elements 50 via the suction line 51 which may have the hereinafter mentioned constant pressure valve 52 therein and finally connects to the suction side of the compressor 48a. The usual refrigerator temperature control 53 is provided with its bulb 54 in the insulated space 55 to be cooled, and this controls the motor 48c driving the compressor. This control determines the periodic cycling of the compressor, depending only upon the temperature of the refrigerated space 55.

All these connections of this assembly (except the special expansion valve 10) are those common to any type of compressor system and may be varied within wide limits when practicing the improved method or system herein described.

This new method contemplates the location of bulb 22 outside the space 55 to be refrigerated and the bulb 26 inside this space, bulb 26 being preferably in thermal contact with the suction end of the evaporator, as shown at 56.

Any increase in temperature of and pressure in bulb 22 is transmitted to chamber 21, forces diaphragm 19 downwards, thus moving stem 12 against the pressure of spring load 16 and opening valve head 13, thereby increasing the inflow of liquid refrigerant.

Any decrease in temperature of and pressure in bulb 26 would have the reverse effect, as the accompanying decrease in pressure in chamber 25 would allow the stem 12 to raise and partially close or throttle the inflow of liquid refrigerant.

The effect of the two combined forces applied by bulbs 22, 26 to the valve is control of the amount of refrigerant admitted to the evaporator 50 as required to refrigerate the space 55 to the degree determined by the setting of temperature control 53, the amount of liquid being in direct relation to the amount required by the heat leakage at varying temperature differences between the outside and inside temperatures. Sometimes the bulbs assist and at other times oppose each other.

This temperature difference is the controlling factor that determines the amount of heat to be removed from space 55. The greater the temperature difference the more evaporator surface is supplied with refrigerant, and vice versa.

By controlling the effective evaporator surface, the relative humidity of the space 55 is controlled.

The valve 10 is adjusted to utilize the entire evaporator surface at maximum outside temperatures. The evaporator is selected for maximum outside temperatures or what is the same thing, to have sufficient surface to maintain proper refrigerator temperatures with normal "running" and "off" cycles of the condensing unit, to result in the desired percentage of relative humidity, for the products to be refrigerated. At any temperatures below this maximum, for which the valve is adjusted, bulb 22 tends to throttle the inflow of liquid to keep the evaporator 50 constantly balanced, with the B. t. u. load, hence keeping the relative humidity at a desired constant regardless of the prevailing outside temperatures or temperature difference.

Consider the condition resulting from an outside temperature of over 90° F., creating a high pressure within bulb 22 and thus lending its aid in keeping the expansion valve 10 open as far as possible to supply the larger quantity of liquid refrigerant needed to absorb the greater number of B. t. u.'s entering the refrigerator, as a result of this great temperature difference, assuming the refrigerator temperature in space 55 to be 35° F.

By utilizing the entire evaporator (from A to E, Figure 4) and operating at the maximum suction pressure, the condensing unit would be working at maximum efficiency resulting in normal running and rest periods. During these rest periods the temperature of the evaporator rises above the dew point temperature of the inside air and de-humidification ceases, thus maintaining the desired relative humidity.

Consider another example where a small percentage of the evaporator is starved and only that portion from A to D is used. This condition would result from the outside temperature dropping to approximately 75° F., thus slightly decreasing the pressure in bulb 22 and allowing this effect to slightly throttle the expansion valve, thereby slightly reducing the amount of refrigerant admitted to the evaporator in proportion to the slightly reduced B. t. u. heat leakage into the refrigerator due to the decreased temperature difference.

By thermostatically or automatically reducing the effective evaporator surface, the compressor running time is kept at nearly the same time as when the room temperature is 90° F., or above, resulting in the same amount of running time and the same amount of defrosting time.

The result is that the relative humidity is kept at a constant, predetermined percentage for the product involved, which is the condition sought.

In the following example it is assumed that the outside temperature has decreased to 60° F., resulting in a temperature difference of 25° F. It is obvious that with a temperature difference of only 25° F., a smaller amount of effective evaporator surface would be required, as, for example, from A to C instead of from A to D, where the temperature difference was 40° F.

With this reduction in outside temperature to 60° F., with the refrigerator temperature remaining fixed at 35° F., the bulb 22 pressure is reduced and tends to further throttle the expansion valve, producing the desired effect of further starving the evaporator, thereby requiring the condensing unit to operate longer, or as long as it did with a greater temperature difference, thereby keeping the relative humidity at a constant.

Finally, a further effect of the throttling action of the bulb 22 may be noted when the evaporator is used from A to B, for in this example the outside temperature has dropped to 45° F., resulting in a temperature difference of 10° F.

Very little refrigeration is required to absorb the heat leakage resulting from a 10° F. temperature difference. Without the dual control, the entire evaporator would be supplied with refrigerant and all of this large amount of effective surface would absorb the small amount of heat in a very few moments of compressor operation. The result would be that the moisture given up by the product (meat, for example) in the refrigerator would not be taken away and condensed out or frozen out of the evaporator, and these products would become wet, slimy or sticky, because the relative humidity would be excessive.

This system, by further starving the evaporator, or in other words, allowing only the amount of refrigerant into the evaporator required to absorb the relatively small number of B. t. u.'s, keeps the compressor in operation sufficiently long and the coil temperature adequately low to condense out the correct amount of moisture to maintain the proper relative humidity for the product involved.

However, by increasingly starving the evaporator with the decrease in outside temperature, there would be a corresponding decrease in pressure and temperature in the evaporator. This would result in shorter running period and a consequently heavier frosting of the evaporator; perhaps, under some conditions, to such an extent that it would not defrost during the shut-down period. This would be undesirable; hence an automatic regulating valve 52 of known type for maintaining a constant minimum pressure in the evaporator is installed between the outlet of the evaporator E and the intake part of the compressor 48a, and the use of this dual thermostatic valve in conjunction with an automatic constant pressure valve is a part of applicant's invention.

The condition of excessive relative humidity in spaces using fin-and-tube evaporators or the like during cool weather, is well known in the art, and from the foregoing it is evident that the present invention eliminates this difficulty without interfering with the temperature control, which is exercised by conventional means.

The invention is by no means limited to use wherein one of the bulbs 22 is located where it is subject to "outside" (room) or atmospheric temperature. This bulb can be located in another refrigerator, so as to obtain the benefits of the system in connection with a plurality of cooling rooms or refrigerated spaces. This is more fully illustrated in Figure 5 wherein is shown a plurality of separate spaces 57, 58, 59, 60, 61 to be refrigerated. Each space has a complete valve (Figure 1) and evaporator 50, the bulbs 22, 26 being placed as shown.

In this installation, the space 60, for example, will be refrigerated in accordance with the operation of its associated bulbs 22a and 26a, and the system provides for a definite temperature gradient for the whole system of spaces, each dependent on the other and all thereby related and controlled without, however, any linkage between spaces 57 and 60, for example, except the linkage brought about by the interposition of the independent spaces 58 and 59 and their temperature relationship to 57—60.

Such interdependent cooling chambers are useful in many industrial processes.

What is claimed is:

1. A refrigeration system having a cooling element, means for circulating a refrigerant therethrough, a throttling valve connected to said element to regulate the flow of refrigerant therethrough, and thermostatic means connected to said valve to control the same including two thermostatic elements, one of which is subject to the temperature changes in a space to be refrigerated, the remaining thermostat being located outside said space and independent of temperature changes in said space, and adapted to increase the opening of said valve upon a rise in temperature outside said space.

2. In a refrigeration system as claimed in claim 1 wherein said thermostatic elements are interconnected to permit them to assist each other to open said valve.

3. A refrigerating system having a cooling element, means for circulating a refrigerant therethrough, a throttling valve connected to said element to regulate the flow of refrigerant therethrough and having an operable member, and means cooperating with said member to operate the same to control the passage of refrigerant through said valve including two thermostatic pressure generating elements acting directly on said member, one of said elements being located within and the other without the space refrigerated by said cooling element, said last element being adapted to increase the opening of said valve upon a rise in temperature outside said space.

4. A refrigerating system having a confined space containing a cooling element, means for circulating a refrigerant through said element, a throttling valve connected to said element to regulate the flow of refrigerant therethrough, and temperature responsive means cooperating with said valve to increase the flow of refrigerant therethrough whereby the effective area of said cooling element is automatically increased upon rise of temperature outside said space and decreased upon fall of said outside temperature to produce a desired constant relative humidity within said confined space during varying of said outside temperature conditions.

5. A refrigerating system as claimed in claim 4 wherein said temperature responsive means includes thermostatic members, one of which is located in and the other outside the space to be refrigerated.

6. In a refrigerating system for removing heat from a space to be refrigerated and having a cooling element therein, means for regulating the effective area of said cooling element comprising a throttling valve connected thereto and adapted to control the flow of refrigerant therethrough, and means for controlling said valve in accordance with temperatures existing within and without said space, said means including temperature responsive devices located within and without said space and operatively connected to said valve to open the same upon increase of temperature at either or both said thermostats.

7. In a refrigeration system having independent spaces to be refrigerated, a cooling element in each space, means for regulating the effective area of one of said cooling elements comprising a throttling valve connected thereto and adapted to control the flow of refrigerant therethrough, means for controlling said valve in accordance with the temperature existing within the space in which said regulated cooling element is located, and means for controlling said valve in accordance with the temperature existing in another refrigerated space, said last means including a temperature responsive device located in said last space and operatively connected to said valve.

8. In a refrigerating system, in combination, an enclosure to be refrigerated, an evaporator therein, means to circulate a volatile refrigerant through said evaporator including a liquid supply line and a suction line connected to said evaporator, a throttling valve responsive to pressure in said evaporator to control the flow of liquid from said liquid line into said evaporator, means to maintain a predetermined minimum pressure in said evaporator, thermostatic means connected to said valve and to said outlet pipe within said closure, said thermostatic means being responsive to increase in temperature of said outlet pipe to increase the opening of said valve, second thermostatic means connected to said valve and directly responsive to decrease in temperature outside said closure to decrease the opening of said valve, and means independent of said first and second thermostatic means and valve to control said circulating means.

9. In a refrigerating system, in combination, a closure to be refrigerated, an evaporator in said closure, means to circulate a volatile refrigerant through said evaporator, means responsive to the temperature in said closure to control said circulating means whereby said temperature may be regulated, a valve responsive to pressure in said evaporator to control the feed of liquid thereto, means to maintain a predetermined minimum pressure in said evaporator, thermostatic means responsive to rise in the outlet temperature of said evaporator to increase the opening of said valve, and second thermostatic means directly responsive to decrease in temperature outside said closure to decrease the opening of said valve.

10. In a refrigerating system having a cooling element, means for circulating a refrigerant therethrough, a throttling valve connected to said element to regulate the flow of refrigerant therethrough, and temperature responsive means comprising thermostats subject to the temperatures inside and outside the space to be refrigerated connected to said valve and individually or conjointly operative to cause said valve to admit refrigerant to said cooling element in accordance with the temperature difference between said temperature responsive means.

KENNETH M. NEWCUM.